United States Patent
Ritz et al.

(10) Patent No.: US 7,376,968 B2
(45) Date of Patent: May 20, 2008

(54) BIOS INTEGRATED ENCRYPTION

(75) Inventors: Andrew J. Ritz, Sammamish, WA (US); David B. Cross, Redmond, WA (US); Duncan Bryce, Redmond, WA (US); James A. Schwartz, Jr., Seatlle, WA (US); Jianrong Gu, Bellevue, WA (US); Scott A. Field, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 888 days.

(21) Appl. No.: 10/718,153

(22) Filed: Nov. 20, 2003

(65) Prior Publication Data

US 2005/0111664 A1   May 26, 2005

(51) Int. Cl.
G06F 1/00 (2006.01)
G06F 17/30 (2006.01)
G06F 9/00 (2006.01)

(52) U.S. Cl. .............. 726/17; 713/2; 713/330
(58) Field of Classification Search ............ 713/2, 713/330; 726/17
See application file for complete search history.

(56) References Cited

U.S. PATENT DOCUMENTS

| | | | |
|---|---|---|---|
| 5,604,887 A | 2/1997 | Naidu et al. | |
| 5,652,868 A | 7/1997 | Williams | |
| 5,765,197 A | 6/1998 | Combs | |
| 5,960,084 A | 9/1999 | Angelo | |
| 6,044,155 A | 3/2000 | Thomlinson et al. | |
| 6,189,100 B1 | 2/2001 | Barr et al. | |
| 6,253,324 B1 | 6/2001 | Field et al. | |
| 6,263,431 B1 | 7/2001 | Lovelace et al. | |
| 6,317,836 B1 | 11/2001 | Goren et al. | |
| 6,357,000 B1 | 3/2002 | Jain | |
| 6,532,542 B1 | 3/2003 | Thomlinson et al. | |
| 6,581,162 B1 | 6/2003 | Angelo et al. | |
| 6,651,171 B1 | 11/2003 | England et al. | |
| 6,684,326 B1 | 1/2004 | Cromer et al. | |

OTHER PUBLICATIONS http://www.microsoft.com/whdc/system/platform/pcdesign/secure-start_exec.mspx, year 2005.*
"Why Bother About BIOS Security?",http://www.sans.org/reading_room/whitepapers/threats/108.php, year 2001.*
Optimal power-down strategies Augustine, J.; Irani, S.; Swamy, C.; Foundations of Computer Science, 2004. Proceedings. 45th Annual IEEE Symposium on Oct. 17-19, 2004 pp. 530-539.*

(Continued)

*Primary Examiner*—David Jung
(74) *Attorney, Agent, or Firm*—Amin, Turocy & Calvin, LLP

(57) ABSTRACT

A system and method for facilitating BIOS integrated encryption is provided. An interface is defined between the operating system and the BIOS. The operating system employs this interface to provide BIOS code information to facilitate decryption of data that is encrypted on the system. In the pre-operating system boot phase, the BIOS employs the decryption information provided from this interface in order to decrypt the data. The decrypted information can be employed to facilitate secure rebooting of a computer system from hibernate mode and/or secure access to device(s).

32 Claims, 9 Drawing Sheets

OTHER PUBLICATIONS

A network-oriented power management architecture Pollo, L.F.; Jansch-Porto, I.; Integrated Network Management, 2003. IFIP/IEEE Eighth International Symposium on Mar. 24-28, 2003 pp. 693-706.*

A node hibernation protocol utilizing multiple transmit power levels for wireless sensor networks Panchabhai, A.M.; Baum, C.W.; Vehicular Technology Conference, 2004. VTC2004-Fall. 2004 IEEE 60th vol. 4, Sep. 26-29, 2004 pp. 2808-2813 vol. 4.*

Advanced Configuration and Power Interface Specification, Revision 2.0a, Compaq/Intel/Microsoft/Phoenix/Toshiba, Mar. 31, 2002.

William A. Arbaugh, et al., Automated Recovery in a Secure Bootstrap Process, Aug. 1, 1997, pp. 1-17.

* cited by examiner

BIOS INTEGRATED ENCRYPTION

TECHNICAL FIELD

The present invention relates generally to data encryption/decryption, and more particularly to a system and method of BIOS integrated encryption/decryption.

BACKGROUND OF THE INVENTION

The Advance Configuration and Power Interface ("ACPI") specification defines five states:
  S0 Working state
  S1 Sleeping with processor context maintained
  S2 The S2 sleeping state is logically lower than the S1 state and is assumed to conserve more power
  S3 The S3 state is logically lower than the S2 state and is assumed to conserve more power.
  S4 Hibernate state
  S5 Soft off—similar to the S4 state except that operating system does not save context.

The hibernate state is a popular mobile power saving feature. During a hibernate, a memory image called the "hiber file" (hiberfil.sys) is created and written to disk. The system then shuts off and typically consumes the same amount of power in S4 as it does when the system is completely powered off (S5). Conventionally, when the system is powered on, the system runs through the normal boot process up until the operating system loader is invoked. The operating system loader sees the hiber file on disk and reads that file into memory, and then resumes the system at the point it hibernated the system. To the user, no data is lost and their desktop is restored to how they left it. For instance, if the user had a document open when the user initiated the hibernate, the document is open upon resume from hibernate.

A special form of hibernate is called "critical hibernate". This typically occurs in response to a low battery alarm firing. In this scenario, it is assumed that there is just enough power to hibernate the system and prevent data loss. Because of this, the system does not allow any blocking calls to applications during a critical hibernate.

Many users employ file encryption (e.g., EFS) on their computer systems, especially mobile systems that can be taken to various location(s) (e.g., unsecured). EFS allows user(s) to know that their sensitive documents are protected, even if the mobile system is stolen. However, conventionally, encryption and hibernate are mutually exclusive as the hiber file is not generally encrypted as in-memory data is not typically encrypted. The hiber file is a compressed copy of the "dirty" page(s) of in-memory data.

Additionally, conventionally, EFS has been an operating system feature. Accordingly, decryption capabilities are not typically available in the pre-operating system environment. Thus, even if a user has encrypted a document on disk, if the document is open on the desktop when the hibernate is initiated, an unencrypted version of the document can be retrieved from the hiber file (e.g., during system reboot).

With ever increasing concerns regarding system security, especially with regard to mobile computer systems, data encryption has proven to be a valuable tool. However, conventionally, even encrypted data that was in use when a system is placed into hibernate state (S4), has been vulnerable upon rebooting of the system.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention provides for a system and method facilitating BIOS integrated encryption. An interface is defined between the operating system and the BIOS. The operating system employs this interface to provide BIOS code information to facilitate decryption of data that is encrypted on the system and/or encryption of data (e.g., encryption algorithm). In the pre-operating system boot phase, the BIOS employs the decryption information provided from this interface in order to decrypt the data, for example, a hibernate file. The decrypted information can be employed to facilitate secure rebooting of a computer system from hibernate mode and/or secure access to file(s), data and/or storage device(s).

In accordance with an aspect of the present invention, a cryptographic component comprising a communication component and a retrieval component is provided. The cryptographic component facilitates decryption and/or encryption of data that is used during the operating system boot process (e.g. secure boot process and/or return from hibernate mode). Additionally and/or alternatively, the cryptographic component can facilitate encryption and/or decryption of stored information (e.g., securing volume(s)) and/or secure access to device(s) (e.g., video display, input device(s) and/or output device(s). For example, the cryptographic component can employ symmetric and/or public-key algorithm(s) for encrypting and/or decrypting data.

In one example, in response to a request for decryption information (e.g., decryption key and/or decryption algorithm) from a BIOS component, the cryptographic component can unlock, derive and/or retrieve a decryption key to be employed by the BIOS component (e.g., via a pre-operating system disk driver) in retrieving data (e.g., hibernate file) employed during rebooting of a computer system. In another example, once the decryption key has been retrieved and the operating system loader launched, the decryption key can be used to provide secure access to volume(s) (e.g., storage media) and/or device(s). Thus, with regard to encryption integration in the pre-operating system environment, the cryptographic component can facilitate, for example, (1) encryption and hibernation support; and, (2) volume level encryption. For example, the retrieval component can include an option ROM for PC AT system(s).

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

GLOSSARY OF TERMS

Figure 1:
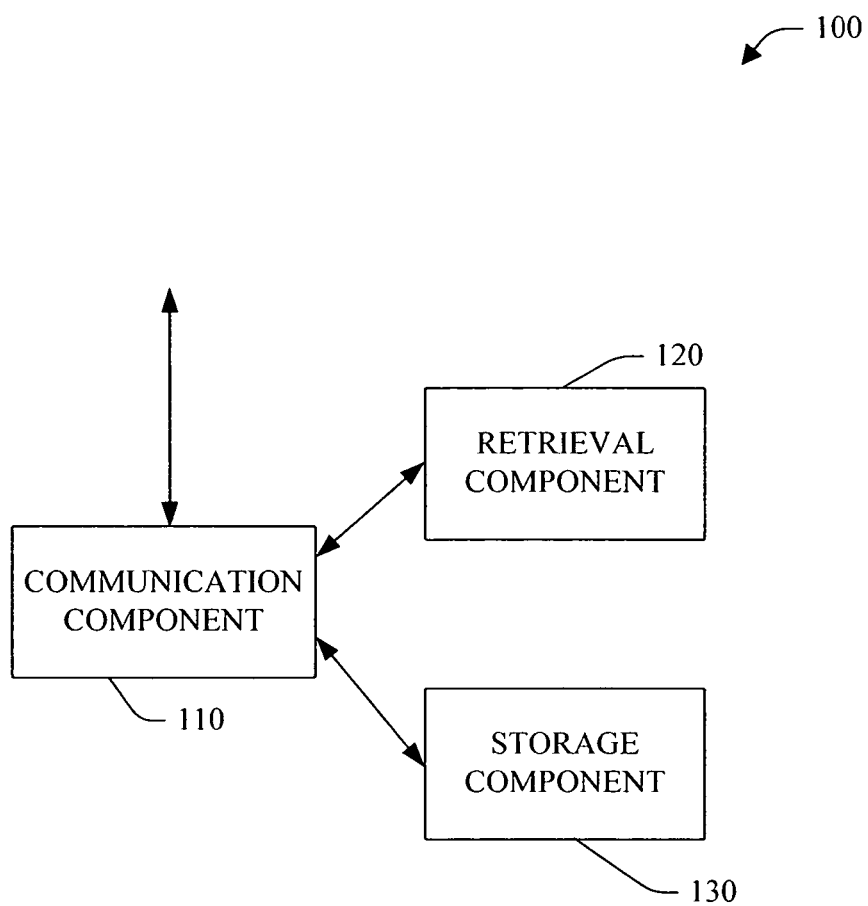
FIG. 1 is a block diagram of a cryptographic component in accordance with an aspect of the present invention.

OSPM—An operating system component that interacts with ACPI firmware and/or hardware.

ACPI BIOS—Refers to system firmware, usually from a ROM and/or flash memory device, which is involved in runtime management of device(s).

Device—A discreet physical resource present in a computer system.

Device driver—Refers generally to software that runs in an operating system context which controls a device.

ASL—ACPI Source Language which is used by programmer(s) (e.g. human(s)) to write the ACPI BIOS.

AML—ACPI Machine Language which is used by computers to represent the ACPI BIOS. ASL becomes AML with an assembler. It is not a native machine language; it is interpreted by the operating system via an interpreter.

Control Method—Refers to an object within the ACPI BIOS that is made up of AML. It can take argument(s) and return value(s). A control method can manipulate platform hardware by referencing operation region(s). The OSPM can use control method(s) for querying the state of a device and/or for changing the state of a device.

Pre-operating system environment: The boot environment that the computer system starts—BIOS boot services are available in this environment (e.g., PC/AT boot environment and the EFI boot environment). The operating system loader generally runs in the pre-operating system environment.

Int13h: The PC/AT BIOS boot service that deals with disk service(s).

System Partition: The partition on the boot disk that contains the bootcode and operating system loader components. On EFI systems, there is no bootcode and this partition is called the EFI System Partition (ESP).

Boot Partition: The partition on the system disk that contains the operating system.

Encryption Algorithm: A function that provides the following encoding: Encrypted Blocks=F(Unencrypted Blocks, $Key_1$);

Decryption Algorithm: A function that provides the following decoding: Unencrypted Blocks=$F^{-1}$(Encrypted Blocks, $Key_2$).

DETAILED DESCRIPTION OF THE INVENTION

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component," "handler," "model," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). Computer components can be stored, for example, on computer readable media including, but not limited to, an ASIC (application specific integrated circuit), CD (compact disc), DVD (digital video disk), ROM (read only memory), floppy disk, hard disk, EEPROM (electrically erasable programmable read only memory) and memory stick in accordance with the present invention.

Referring to FIG. 1, a cryptographic component 100 in accordance with an aspect of the present invention is illustrated. The cryptographic component 100 includes a communication component 110 and a retrieval component 120. Optionally, the component 100 can include a storage component 130.

As discussed previously, conventionally, there has been a limitation on the use of encrypted data by the pre-operating system environment, as the pre-operating system environment does not normally have the ability to decrypt data that was encrypted by the OS. The cryptographic component 100 can facilitate decryption and/or encryption of data that is used during the operating system boot process (e.g., secure boot process and/or return from hibernate mode). Additionally and/or alternatively, the cryptographic component 100 can facilitate encryption and/or decryption of stored information (e.g., securing volume(s)) and/or secure access to device(s) (e.g., video display, input device(s) and/or output device(s).

Cryptography Overview

The cryptographic component 100 can facilitate encryption and/or decryption of data (e.g., secure boot process from hibernation and/or secure access to stored information and/or device(s)). In general, cryptography is the process for encrypting or encoding data item(s) such that the information can be stored and/or transmitted securely and not decoded without a corresponding decryption key. Cryptography can be used to achieve data security, for example, via encryption of sensitive files, such that an intruder cannot understand them. When using cryptographic method(s), generally only the cryptographic key(s) remains secret. For example, the algorithm(s), the key size(s), and/or file format(s) can be made public without generally compromising security.

Using data encryption, a data item can be scrambled so that it appears like random gibberish and is very difficult to transform back to the original data without a secret key. For example, the data item can be a document file, image file and/or any other type of data such a storage volume, physical disk block, etc.

Once a data item has been encrypted, it can be stored on non-secure media or transmitted over a non-secure network, and still remain secret. Subsequently, the data item can be decrypted into its original form.

When a data item is encrypted, an encryption key is typically employed. This is comparable to a key that is used to lock a padlock. To decrypt the data item, a decryption key is employed. The encryption and decryption keys are often, but not always, the same key.

There are two main classes of encryption algorithms: symmetric algorithms and public-key algorithms (also known as asymmetric algorithms). Systems that use symmetric algorithms are sometimes referred to as "conventional".

Symmetric algorithms are the most common type of encryption algorithm. They are known as symmetric because the same key is used for both encryption and decryption. Unlike the keys used with public-key algorithms, symmetric keys are frequently changed.

Compared to public-key algorithms, symmetric algorithms are very fast and, thus, are preferred when encrypting large amounts of data. Some of the more common symmetric algorithms are RC2, RC4, the Data Encryption Standard (DES), 3DES and AES.

Public-key (asymmetric) algorithms use two different keys: the public key and the private key. The private key is kept private to the owner of the key pair, and the public key can be distributed to anyone who requests it (often by means of a certificate). If one key is used to encrypt a message, then the other key is required to decrypt the message. Public-key algorithms are slow—on the order of 1,000 times slower than symmetric algorithms. One of the most common public-key algorithms is the RSA Public-Key Cipher.

Those skilled in the art will recognize that the cryptographic component 100 can employ any suitable cryptographic technique(s) (e.g., block encryption and/or stream cipher). Thus, it is to be appreciated that any type of cryptographic technique suitable for carrying out the present invention can be employed and all such cryptographic technique(s) are intended to fall within the cope of the appended claims.

Cryptographic Component 100

In one example, the communications component 110 receives a request for decryption information (e.g., decryption key and/or decryption algorithm) from a BIOS component (not shown). The communications component 110 provides the request to the retrieval component 120 which retrieves the decryption information (e.g. decryption key and/or decryption algorithm), unlocks the decryption key and/or derives the decryption key. The retrieval component 120 provides the decryption information to the communications component 110 which thereafter provides it to the BIOS component. The bios component can, for example, include a disk driver as a specific consumer of the decryption key.

Figure 2:
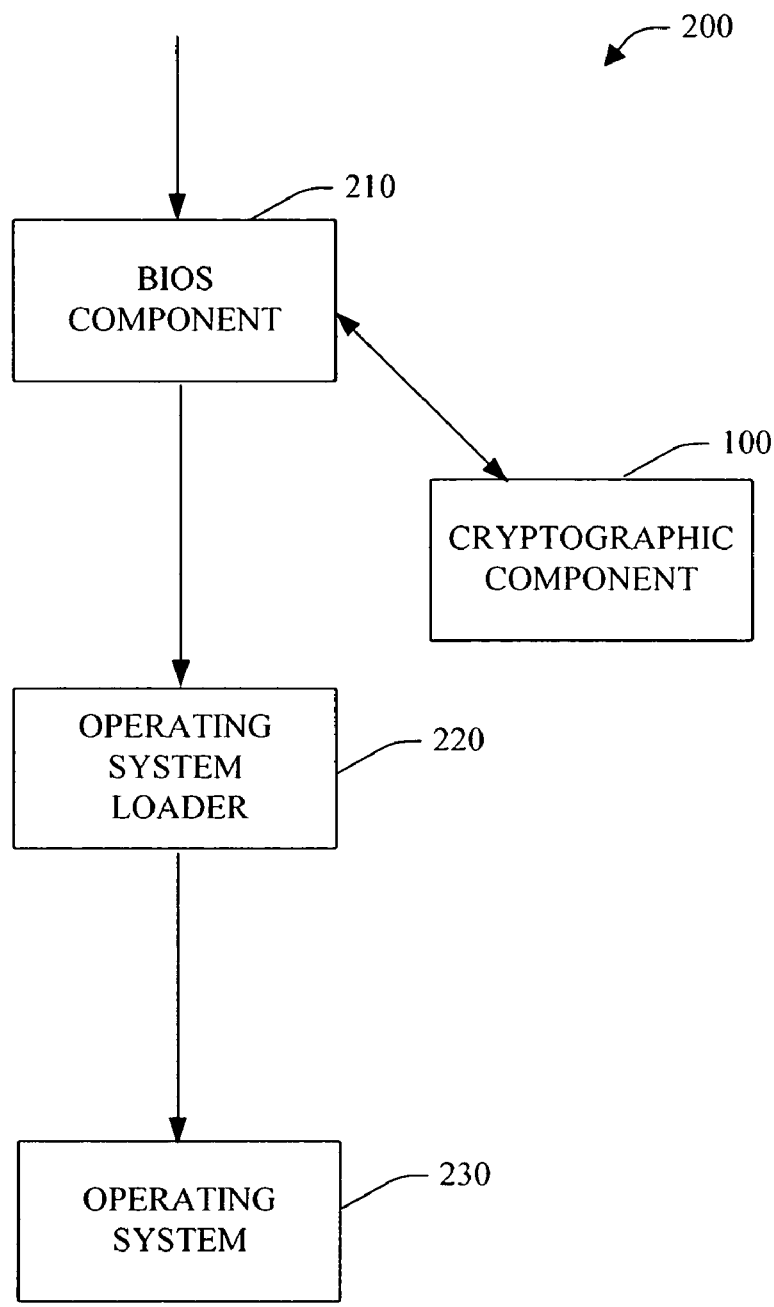
FIG. 2 is a block diagram of a BIOS cryptographic system in accordance with an aspect of the present invention.

Turning briefly to FIG. 2, a BIOS cryptographic system 200 in accordance with an aspect of the present invention is illustrated. In the system 200, the cryptographic component 100 can serve as an interface between a BIOS component 210 and an operating system loader 220. The operating system loader 220 can employ the cryptographic component 100 to provide the BIOS component 210 with information (e.g., protected and/or wrapped decryption key and/or decryption algorithm) to facilitate decryption of data that is encrypted on a computer system (e.g., hiber file, for example, "hiberfil.sys"). For example, the cryptographic component 100 can be an operating system installed BIOS driver. Thus, in the pre-operating system boot phase, the BIOS component 210 uses the decryption information provided by the cryptographic component 100 in order to decrypt the data to facilitate secure booting of the computer system.

Thus, with regard to encryption integration in the pre-operating system environment, the cryptographic component 100 can facilitate, for example, (1) encryption and hibernation support; and, (2) volume level encryption.

Encryption and Hibernation Support

As discussed previously, one popular mobile power saving feature is hibernate (S4). During a hibernate, a memory image called the "hiber file" (hiberfil.sys) is created and written to disk. The system then shuts off and typically consumes the same amount of power in S4 as it does when the system is completely powered off (S5). Conventionally, when the system is powered on, the system runs through the normal boot process up until the operating system loader is invoked. The operating system loader sees the hiber file on disk and reads that file into memory, and then resumes the system at the point it hibernated the system. To the user, 110 data is lost and their desktop is restored to how they left it. For instance, if the user had a document open when the user initiated the hibernate, the document is open upon resume from hibernate.

A special form of hibernate is called "critical hibernate". This typically occurs in response to a low battery alarm firing. In this scenario, it is assumed that there is just enough power to hibernate the system and prevent data loss. Because of this, the system does not allow any blocking calls to applications during a critical hibernate.

Many users employ file encryption (e.g., EFS) on their computer systems, especially mobile systems that can be taken to various location(s) (e.g., unsecure). EFS allows user(s) to know that their sensitive documents are protected, even if the mobile system is stolen. However, conventionally, encryption and hibernate are mutually exclusive as the hiber file is not generally encrypted as in-memory data is not typically encrypted. The hiber file is a compressed copy of the "dirty" page(s) of in-memory data.

Additionally, conventionally, EFS has been an operating system feature. Accordingly, decryption capabilities are not typically available in the pre-operating system environment. Thus, even if a user has encrypted a document on disk, if the document is open on the desktop when the hibernate is initiated, an unencrypted version of the document can be retrieved from the hiber file (e.g., during system reboot).

For example, the hibernation encryption can be enabled when the operating system is started and loaded. An administrator can configure the system through local or central policy and the user can also configure the local system to enable hibernation or volume encryption with the BIOS.

One mode for implementation is to configure the BIOS with one or more credentials or user account identifiers who may unlock the BIOS and decryption key at boot time. An admin can configure manually or through policy a recovery password, user identifier or credential for recovery purposes. To facilitate involuntary hibernate and emergency shutdown of the system, the user would also be required to supply a credential, passphrase, etc. to be used by the system (operating system) to use for encryption when no user is logged on to the system.

An aspect of the present invention facilitates mitigation of this security hole by facilitating encryption/decryption of the hiber file, thus, allowing hibernate to remain a "transparent operation" (e.g., for application developer(s)). For example, sensitive data can be secured on a hibernate and/or critical hibernate via the cryptographic component 100. After a request to enter hibernate mode has been received, a hiber file is created. Thereafter, the cryptographic component 100 can encrypt the hiber file using an encryption key. The storage component 130 can then store the decryption information (e.g., decryption key).

Thus, in one example, the system 200 can facilitate secure re-booting of a computer system that has entered hibernate mode (e.g., ACPI power state S4). After the computer system is powered on, the BIOS component 210 can determine whether a disk driver "option ROM" is installed (e.g., facilitating BIOS integrated encryption). If the option ROM is installed, the BIOS component 210 can prompt a user for credential(s) (e.g., user identification information, password and/or BIOS password). Alternatively, in place of the option ROM, a user can configure the system (e.g., manually) to enter BIOS integrated encryption mode. For example, a user can "enable hibernation encryption" and/or "enable volume encryption" and enter a credential, password and/or key for the system to employ at system hibernation.

Thereafter, the BIOS component 210 can verify the credential(s). In one example, a decryption key is derived from the credential(s) and it is employed to decrypt specific known data. Return of an expected pattern from decryption of the specific known data verifies the credential(s).

If the credential(s) are proper, the BIOS component 210 can unlock, retrieve and/or derive a decryption key via the cryptographic component 100. The cryptographic component 100 can retrieve, unlock and/or derive the decryption key as set forth below. Thus, the BIOS component 210 can use the password to retrieve the decryption key directly (via the cryptographic component 100) or the BIOS component 210 can use the password to authenticate the user to retrieve the decryption key that is stored via the cryptographic component 100).

The BIOS component 210 can then continue with booting of the computer system and attempt to read the disk book code (e.g., master boot record (MBR)). The attempt to read the disk book code can be intercepted by the cryptographic component 100 (e.g., operating system installed BIOS driver) which can employ the decryption key to decrypt buffers, disk blocks and/or disk boot code. Thereafter, the disk boot code can be executed and the operating system loader 220 launched.

After the pre-operating system phase is completed, an operating system driver can subsume the responsibility of intercepting read/write requests from the bios driver, which is no longer running in the system. For example, the pre-operating system can have an interface and/or method to pass the operating system drive the decryption key in a secure manner.

In another example, an ACPI method (e.g., Get BIOS key), as discussed below, is employed to retrieve the BIOS key to facilitate decryption of the hibernate file.

Volume Level Encryption

Conventionally, EFS works by encrypting individual files. The boot partition and system partition are not natively encrypted at the volume level as there no conventional mechanism to boot the system from an encrypted volume.

For example, the PC/AT BIOS is responsible for executing code from the master boot record (MBR). This code transfers execution to the boot code of the system partition, which in turn invokes the operating system loader. The operating system loader is the first extensible piece of code that is running on the system. The MBR and boot code is executed prior to the operating system loader running and as such would have to be decrypted in order to run. It is to be appreciated that the operating system loader 220 can be encrypted and/or non-encrypted.

An aspect of the present invention provides for volume level encryption/decryption which provides a mechanism to instruct the BIOS how to decrypt this data and proceed with the boot process.

Thus, optionally, once the decryption key has been retrieved and the operating system loader 220 launched, the decryption key can be used to provide secure access to volume(s) (e.g., storage media) and/or device(s). In this instance, after the disk boot code has been executed and the operating system loader 220 launched, the operating system loader 220 can receive the decryption key from the BIOS component 210 and pass the decryption key to the operating system 230. For example, the operating system 230 can pass the key to a logical disk driver (not shown) (e.g., on PC/AT system(s) an operating system supplied option ROM int 13h handler) which can employ the decryption key to decrypt volume(s) (e.g., storage media). Additionally, the operating system 230 can pass the key to device driver(s) which can employ the decryption key to provide access to device(s) (e.g., video display, input device(s) and/or output device(s)).

The operating system 230 can further pass the decryption key and/or the user credentials to a user logon (authentication) component (not shown) which can employ the decryption key to facilitate secure user log on to the computer system. Thus, in accordance with an aspect of the present invention, a single sign-on to both the hardware platform and to the operating system is enabled. For example, the username and password credentials can not only be used to protect a decryption key, but also used to provide an operating system identity with proof of possession to enable operating system authentication and authorization.

In accordance with an aspect of the present invention, a strong encryption algorithm such as AES-256 is employed since, with respect to volume level encryption, once the data is encrypted, the key cannot change without decrypting the entire volume with the old key and encrypting the volume with a new key.

In one example, a BIOS password is the mechanism for encrypting/decrypting data. The BIOS Password is not saved on the system. For example, the BIOS component 210 can be able to accept multiple encrypted keys. This can facilitate multiple users using different passwords to unlock the computer system. Additionally, unique machine identifiers can be used as "salt" (e.g., random data that is included as part of a key to increase the work required to mount a brute-force attack against the encrypted data). This has the benefit of being tied to a particular machine and can work well on a multi-user system. If user-specified password is employed on a multi-user system difficulties can arise as to which user password is to be used to decrypt the data.

Figure 3:
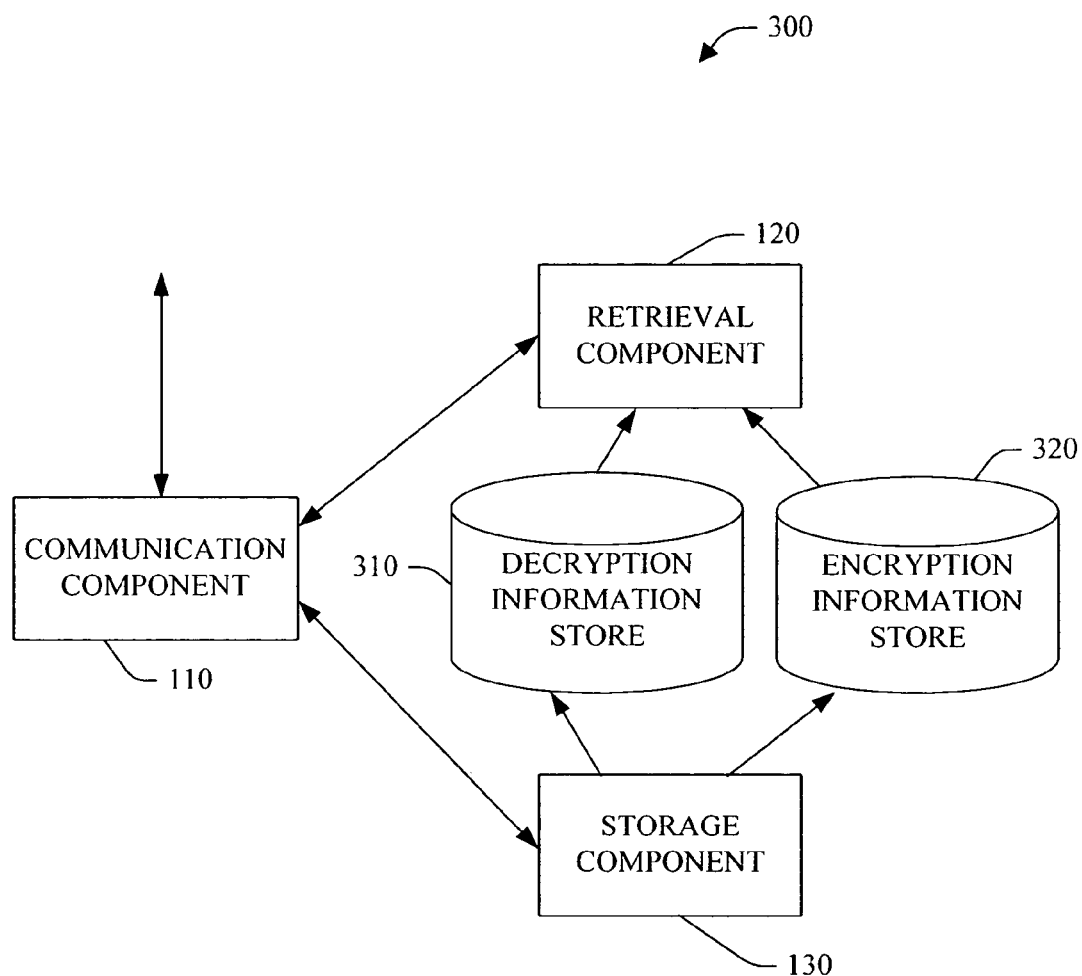
FIG. 3 is a block diagram of a cryptographic component in accordance with an aspect of the present invention.

Next, referring to FIG. 3, a cryptographic component 300 in accordance with an aspect of the present invention is illustrated. The cryptographic component 300 includes a communication component 110, a retrieval component 120, a storage component 130, a decryption information store 310 and an encryption information store 310.

The decryption information store 310 securely stores decryption information, for example, a decryption key (e.g., encrypted) and/or decryption algorithm(s). The encryption information store 320 securely stores encryption information, for example, a BIOS encryption key (e.g., encrypted) and/or encryption algorithm(s). In one example, the decryption key and the encryption key are the same. In another example, the decryption key and the encryption key are not the same.

In yet another example, the decryption information store 310 and/or the encryption information store 320 can comprise BIOS accessible facility(ies) (e.g., removable media, such as CD ROM, USB device etc.) In this example, the decryption information and/or encryption information is based, at least in part, upon information obtained via the BIOS accessible facility(ies). For example, a decryption key can be retrieved from a removable medium.

The information stored in the decryption information store 310 and/or the encryption information store 320 can be based, at least in part, upon information received from the operating system (e.g., operating system programs the BIOS key(s)) and/or the BIOS (e.g., BIOS generates the key(s) and passes to the operating system).

OS Programs BIOS Key

In one example, the operating system 230 programs the BIOS key (e.g., encryption key and/or decryption key) employed by the cryptographic component 110. In this example, if the BIOS key has already been set, request(s) to program the BIOS key are rejected.

The BIOS component 210 can, for example, use a BIOS password to decrypt/encrypt the BIOS key which is stored in the decryption information store 310 and/or encryption information store 320 (e.g., BIOS specific protected storage).

In one example, the mechanism to program the BIOS key is an ACPI method. ACPI methods are defined under a BIOS Key device in the namespace. First, a "\_SB\BKEY\GBKY ( )" (e.g., Get BIOS Key) method is defined which returns the BIOS key. The method has no inputs and returns a buffer with the BIOS key. A second method "\_SB\BKEY\SBKY ( )" (e.g., Set BIOS Key) method is defined which sets the BIOS key. The method receives a buffer with the key as an input and provides an output indicating whether the key was successfully programmed or has previously been set.

BIOS Generates Key and Passes to OS

In another example, the BIOS component 210 generates the BIOS key and passes it to the operating system 230. Many conventional BIOS systems already can prompt a user for a BIOS password. During the boot process, the BIOS prompts for a password and will not proceed until the proper password is provided.

In accordance with an aspect of the present invention, a BIOS boot interface is defined that retrieves a BIOS key. For example, the BIOS key can be decrypted by using the BIOS password. The operating system loader 220 can employ this interface to read the BIOS key and pass this key to the operating system 230 (e.g., via the LOADER_PARAMETER_BLOCK). During system initialization, the BIOS key can be propagated to the subsystem(s) for storage.

For example, the follow mechanism can be employed:
Int 15H, AX=FE—
REQUEST_BIOS_KEY returns a 64 bit key based on BIOS boot password.
Prior to issuing int 15H call
AX=FE
Upon return from int 15H call
AX=bits [15:0] of key.
BX=bits [31:16] of key.
CX=bits [47:32] of key.
DX=bits [63:48] of key.

While this example illustrates a 64 bit key, those skilled in the art will recognize that any suitable size key (e.g., 128 bit and/or 256 bit) can be employed in accordance with an aspect of the present invention.

In one example, the operating system 230 can employ the BIOS key to encrypt/decrypt data.

Operating System Specifies Decryption Algorithm for Use by BIOS

To provide further security, in one example, the operating system 230 and/or the operating system loader 220 can indicate to the BIOS component 210 the proper decryption algorithm to be used. Since the BIOS component 210 can retrieve the decryption key, as discussed previously, the BIOS component 210 can employ the decryption key and the decryption algorithm to decode the data. Alternately, the operating system loader 220 can use the key and decryption routine to decode the hiber file (e.g., hibernation encryption scenario). For example, a stronger key can be realized by employing another piece of data known only between the operating system 230 and operating system loader 220.

Two exemplary approaches for the decryption algorithm are: (1) the operating system 230 specifies an algorithm identifier to the BIOS component 210; and, (2) the operating system 230 can specify the machine instruction stream (e.g., the operating system 230 specifies an "option ROM" that the BIOS component 210 installs during boot up).

The Operating System Specifies an Algorithm Identifier to the BIOS

In one example, when the BIOS int 13h handler retrieves an encrypted block of data from disk, it looks up the encryption algorithm and decrypts the data based on the algorithm identifier. The BIOS returns the decrypted data to the int 13h caller.

An additional "query supported bios algorithms" interface is further defined that facilitates the operating system 230 employing a compatible encryption algorithm. There is an implicit dependency here on the BIOS supporting substantially all of the encryption mechanism(s) desired.
Int 13H, AX=FD—
REQUEST_BIOS_DECRYPT_ALGORITHMS returns a 32 bit bitmask indicating the supported decryption algorithms.
Prior to issuing int 13H call
AX=FD
Upon return from int 13H call
AX=bits [15:0] of bitmask.
BX=bits [31:16] of bitmask.

In another example, ACPI methods associated with encryption API can be provided. For example, "\_SB\BKEY\GAPI( )" (e.g., Get Encryption API List) can be employed to return a list of supported BIOS encryption algorithm identifier(s). This method receives no inputs and provides information (e.g., integer bitmask) of supported algorithm(s). Another control method "\_SB\BKEY\SAPI ( )" (e.g., Set Encryption API) can be defined that sets the BIOS encryption algorithm identifier that is to be employed. The method receives and encryption identifier as an input and provides no output.

Thus, one way to specify an encryption method is by enumerating encryption algorithm(s) that the BIOS support (e.g., by using a catalog of standard encryption algorithm(s)).

Operating System 230 Specifies Machine Instruction Stream

Another way of facilitating encryption algorithm identification is by the operating system 230 specifying the actual machine instruction stream that should be run in the BIOS pre-operating system space. In this manner, the encryption instructions are in sync with the operating system 230, and the operating system 230 is free to innovate with new encryption mechanisms. This method does require the BIOS component 210 to be able to store the instruction stream in some sort of off-disk protected storage. Specifically, this instruction stream cannot be encrypted on disk, as this instruction stream is required to decrypt data on the disk.

In one example, the operating system 230 can install a "BIOS driver" into the pre-operating system space. For example, an extensible firmware interface (EFI) driver for substantially all block I/O devices can be employed on EFI system(s). The EFI driver resides on the extensible system partition(s) (ESP) (e.g., ESP not be encrypted).

On PC/AT-based system(s), an int13 option ROM can be stored in protected storage. The BIOS would be modified to load this "bios driver" prior to retrieving data off of disk. Whenever a disk read request is received, this BIOS "filter driver" is able to decrypt the data before being returned to the caller.

In this example, the operating system 230 specifies an "option ROM" that the BIOS component 210 installs during boot up. For example, this code can install itself as an int13h handler. Alternately some code to be run and to be called by the normal BIOS int13h handler can be specified. After the standard int13h handler retrieves encrypted data from the BIOS component 210, the operating system 230 "int13h filter" uses the BIOS key to decrypt the data. In this mechanism, the operating system 230 has more freedom to keep it's encryption mechanism in sync with the decryption mechanism. In this example, the BIOS component 210 has access to secure protected storage for this code, since it can't be stored on the encrypted partition.

Those skilled in the art will recognize that while this mechanism has been defined to specifically deal with secure disk access, this mechanism can be employed to install "bios drivers" for other areas besides disk access (e.g., video display, input, etc.) in accordance with an aspect of the present invention.

It is to be appreciated that the cryptographic component 110, the communication component 110, the retrieval component 120, the storage component 130, the BIOS component 210, the operating system loader 220, the operating system 230, the decryption information store 310 and/or the encryption information store 320 can be computer components as that term is defined herein.

Turning briefly to FIGS. 4-8, methodologies that may be implemented in accordance with the present invention are illustrated. While, for purposes of simplicity of explanation, the methodologies are shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement the methodologies in accordance with the present invention.

The invention may be described in the general context of computer-executable instructions, such as program modules, executed by one or more components. Generally, program modules include routines, programs, objects, data structures, etc. that perform particular tasks or implement particular abstract data types. Typically the functionality of the program modules may be combined or distributed as desired in various embodiments.

Figure 4:
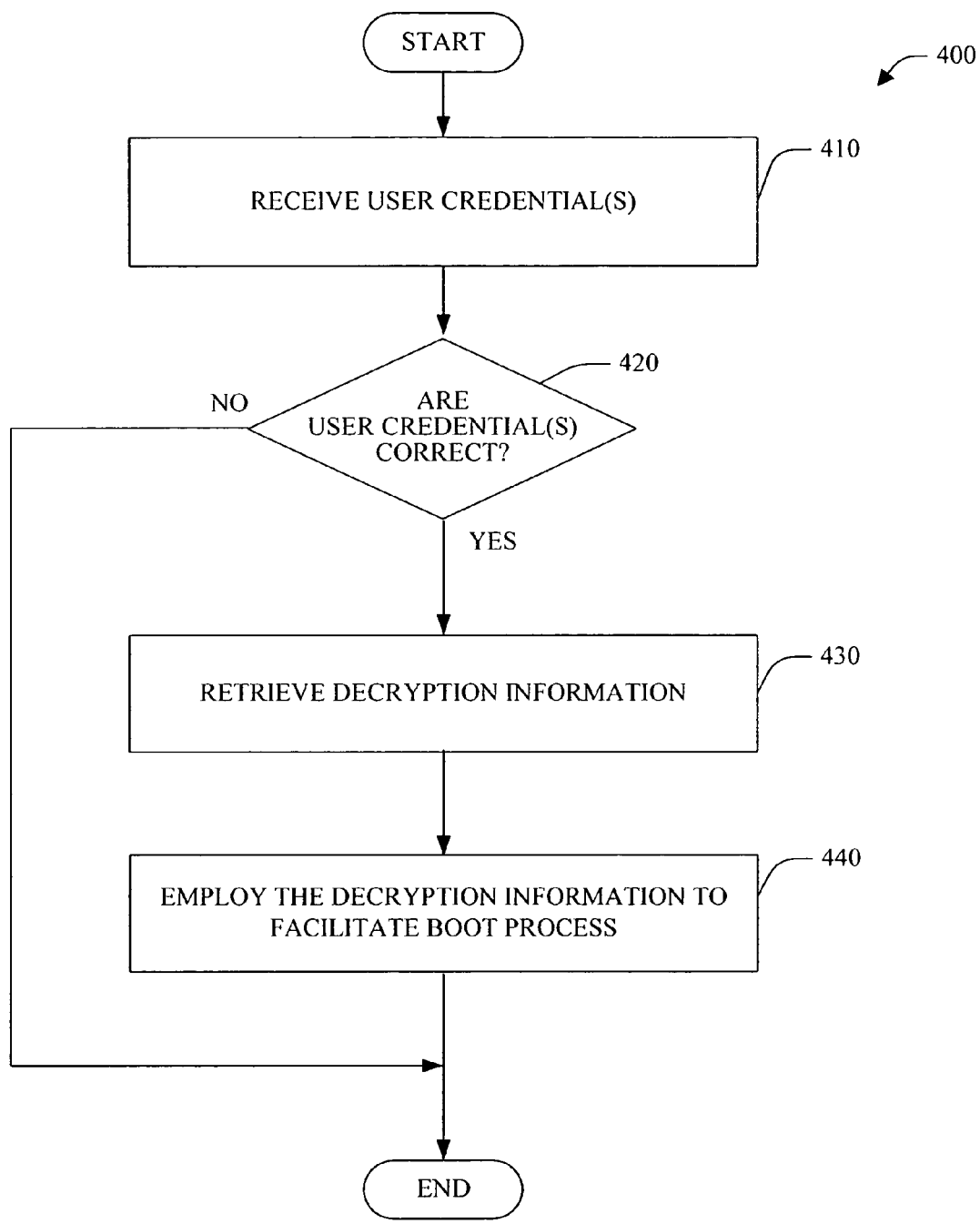
FIG. 4 is a flow chart of a method of securely restarting a computer system in accordance with an aspect of the present invention.

Referring to FIG. 4, a method of securely restarting a computer system 400 in accordance with an aspect of the present invention is illustrated. At 410, user credential(s) (e.g., password and/or BIOS password) are received. At 420, a determination is made as to whether the user credential(s) are correct. If the determination at 420 is NO, no further processing occurs. If the determination at 420 is YES, at 430, decryption information (e.g., decryption key, encrypted decryption key and/or decryption algorithm) are received. For example, a decryption algorithm can be applied to derive a decryption key (e.g. based, at least in part, upon the user credential(s)). Alternatively, a decryption key can be "unlocked" once the user credential(s) have been verified. At 440, the decryption information is employed to facilitate a boot process.

Figure 5:
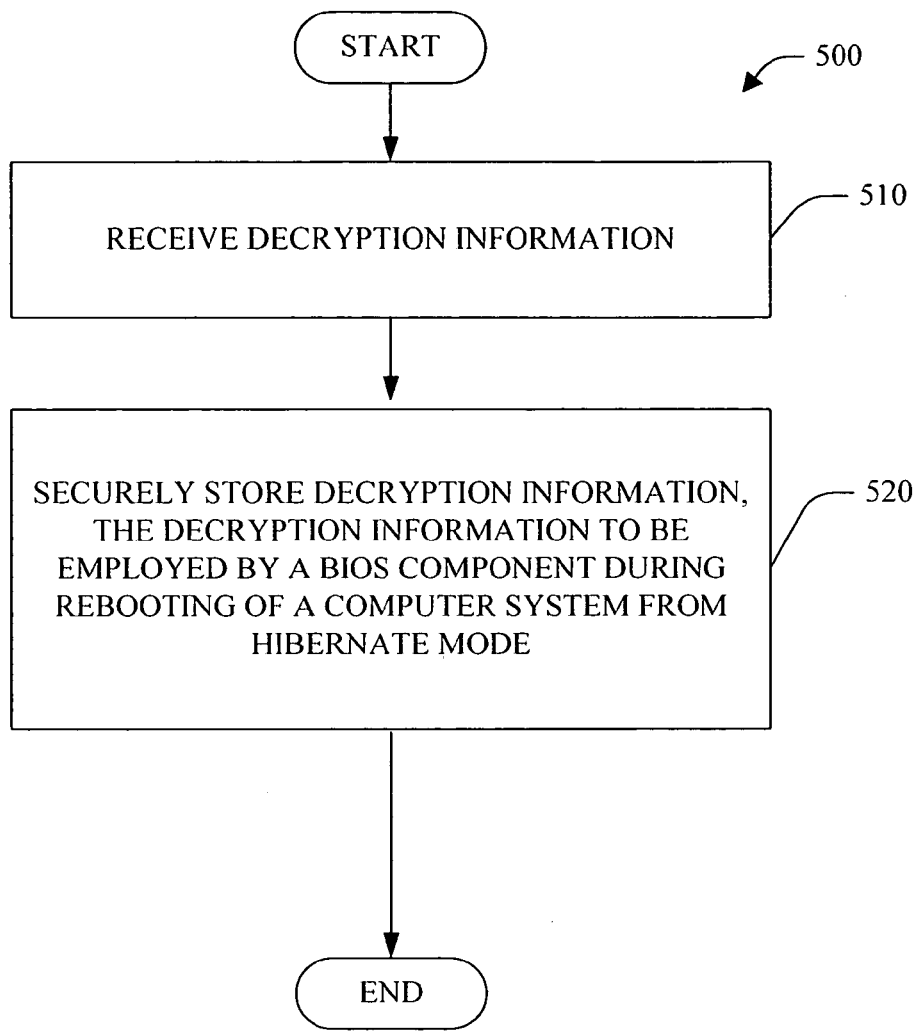
FIG. 5 is a flow chart of a method of facilitating secure restarting of a computer system in accordance with an aspect of the present invention.

Next, turning to FIG. 5, a method of facilitating secure restarting of a computer system 500 in accordance with an aspect of the present invention is illustrated. At 510, decryption information (e.g., decryption key and/or decryption algorithm) is received. At 520, the decryption information is securely stored. For example, the decryption information can be employed by a BIOS component during rebooting of a computer system from hibernate mode.

Figure 6:
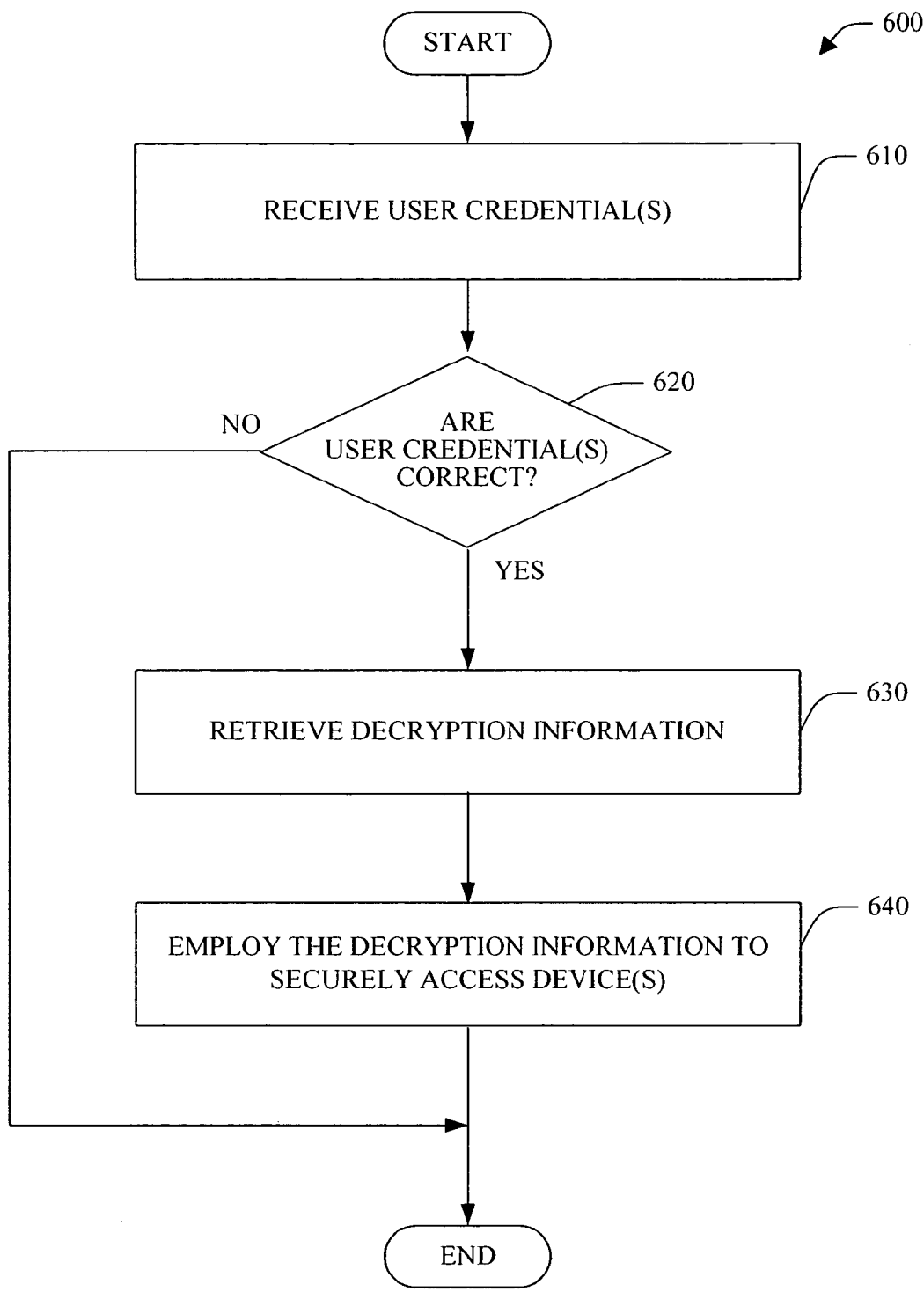
FIG. 6 is a flow chart of a method of securely using a computer system in accordance with an aspect of the present invention.

Referring next to FIG. 6, a method of securely using a computer system 600 in accordance with an aspect of the present invention is illustrated. At 610, user credential(s) (e.g., password and/or BIOS password) are received. At 620, a determination is made as to whether the user credential(s) are correct. If the determination at 620 is NO, no further processing occurs. If the determination at 620 is YES, at 630, decryption information (e.g., decryption key, encrypted decryption key and/or decryption algorithm) are received. For example, a decryption algorithm can be applied to derive a decryption key (e.g., based, at least in part, upon the user credential(s)). Alternatively, a decryption key can be "unlocked" once the user credential(s) have been verified. At 640, the decryption information is employed to securely access a device (e.g., storage volume(s), a video display, input device and/or output device).

Figure 7:
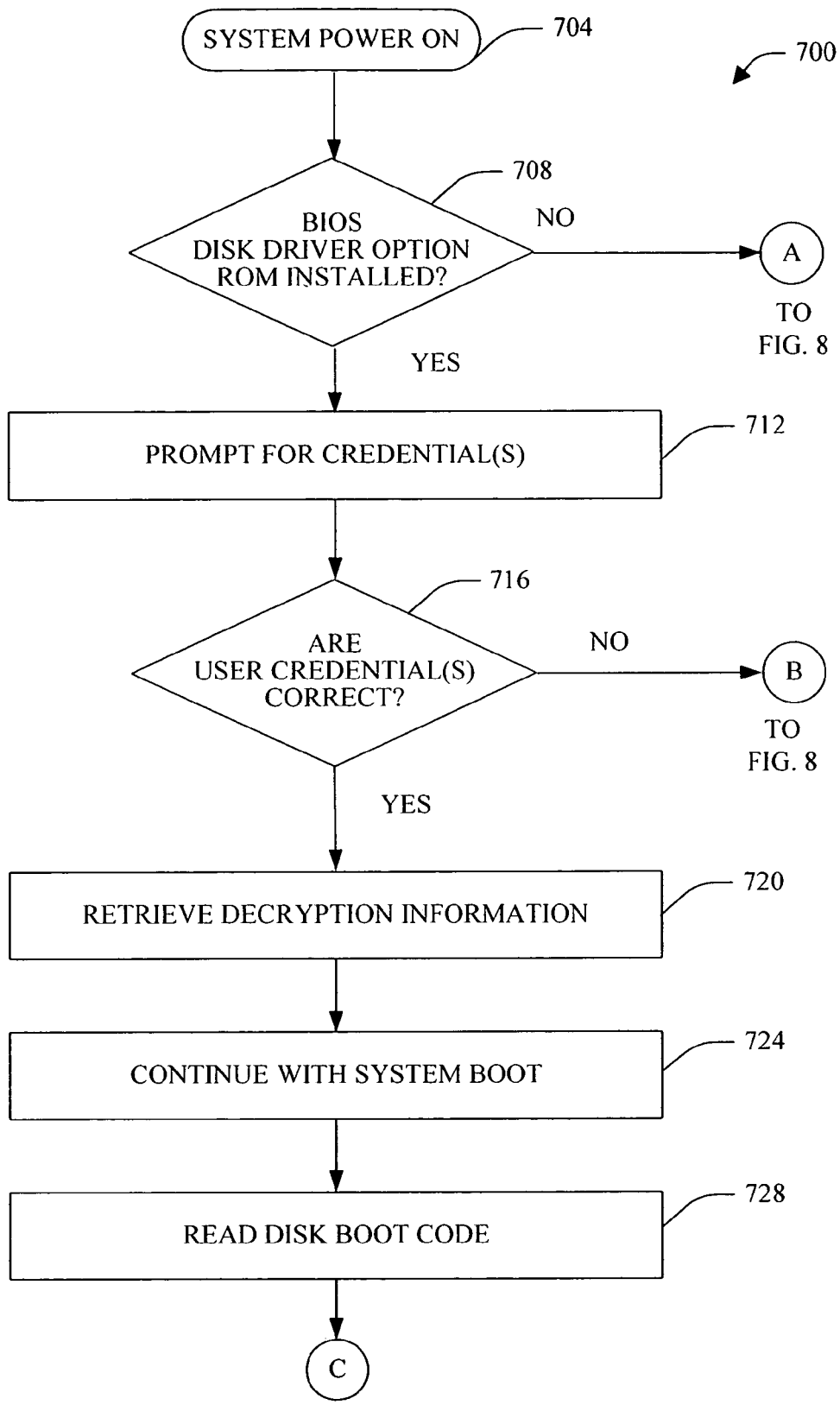
FIG. 7 is a flow chart of a method of securely using a computer system in accordance with an aspect of the present invention.
Figure 8:
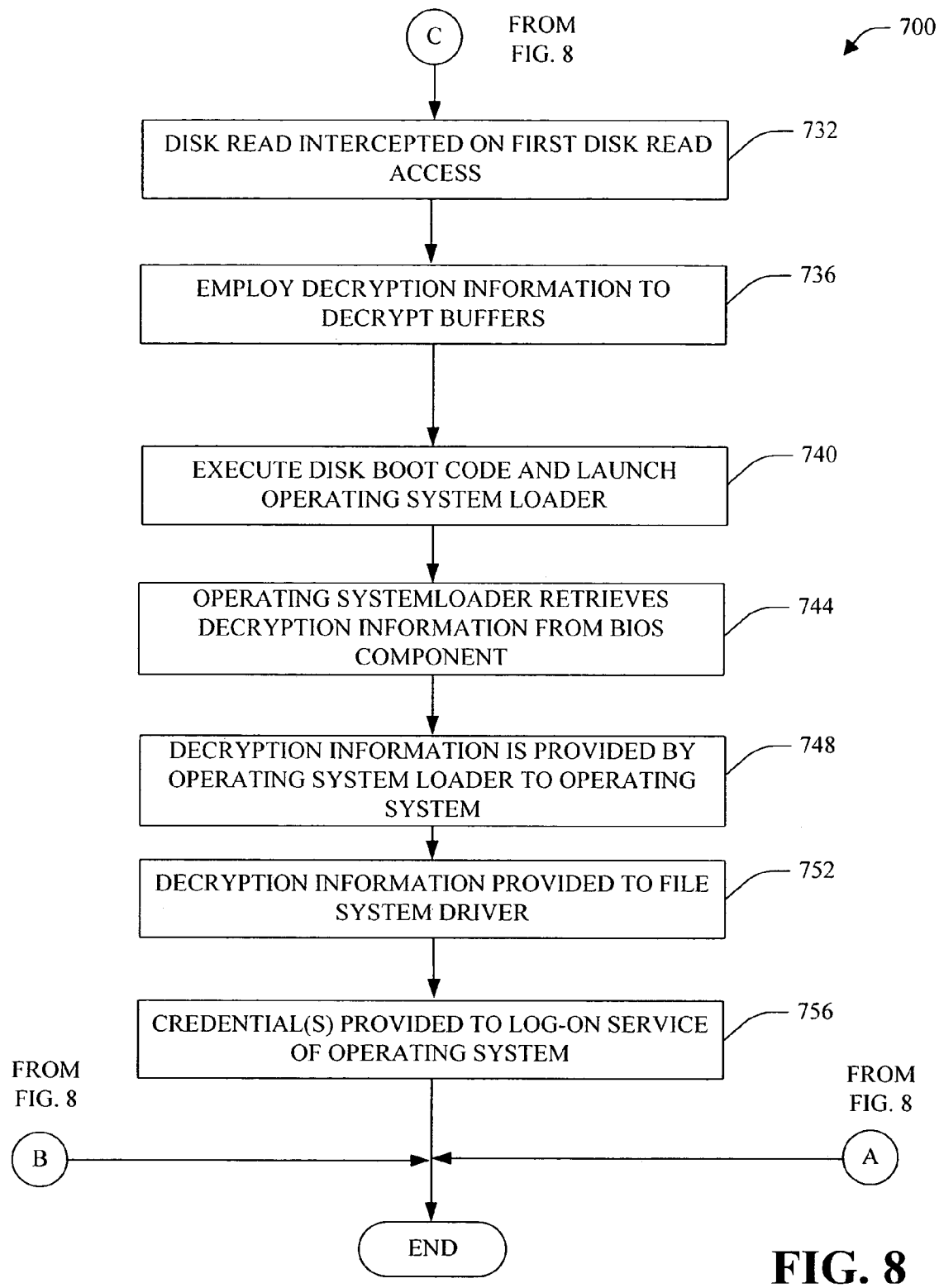
FIG. 8 is a flow chart further illustrating the method of FIG. 7.

Turning to FIGS. 7 and 8, a method of securely using a computer system 700 in accordance with an aspect of the present invention is illustrated. At 704, the computer system is powered on. At 708, a determination is made as to whether a BIOS disk driver option ROM is installed. If the determination at 708 is NO, no further processing occurs (e.g., system powers on normally). If the determination at 708 is YES, at 712, a user is prompted for credential(s) (e.g., BIOS password). At 716, a determination is made as to whether the user credential(s) are correct. If the determination at 716 is NO, no further processing occurs (e.g., user unable to continue with system boot). If the determination at 716 is YES, at 720, decryption information (e.g., decryption password and/or decryption algorithm) is retrieved. For example, a decryption algorithm can be applied to derive a decryption key (e.g., based, at least in part, upon the user credential(s)). Alternatively, a decryption key can be "unlocked" once the user credential(s) have been verified.

At 724, the system boot is continued. At 728, disk boot code is read. At 732, a disk read is intercepted on first disk read access. At 736, the decryption information is employed to decrypt buffer(s). At 740, the disk boot code is executed and the operating system loader is launched.

At 744, the operating system loader retrieves the decryption information from the BIOS component. At 748, the decryption information is provided by the operating system loader to the operating system.

At 752, the decryption formation is provided to the file system driver. At 756, the credential(s) are provided to a log-on service of the operating system (e.g., facilitating single credential system log-on).

Figure 9:
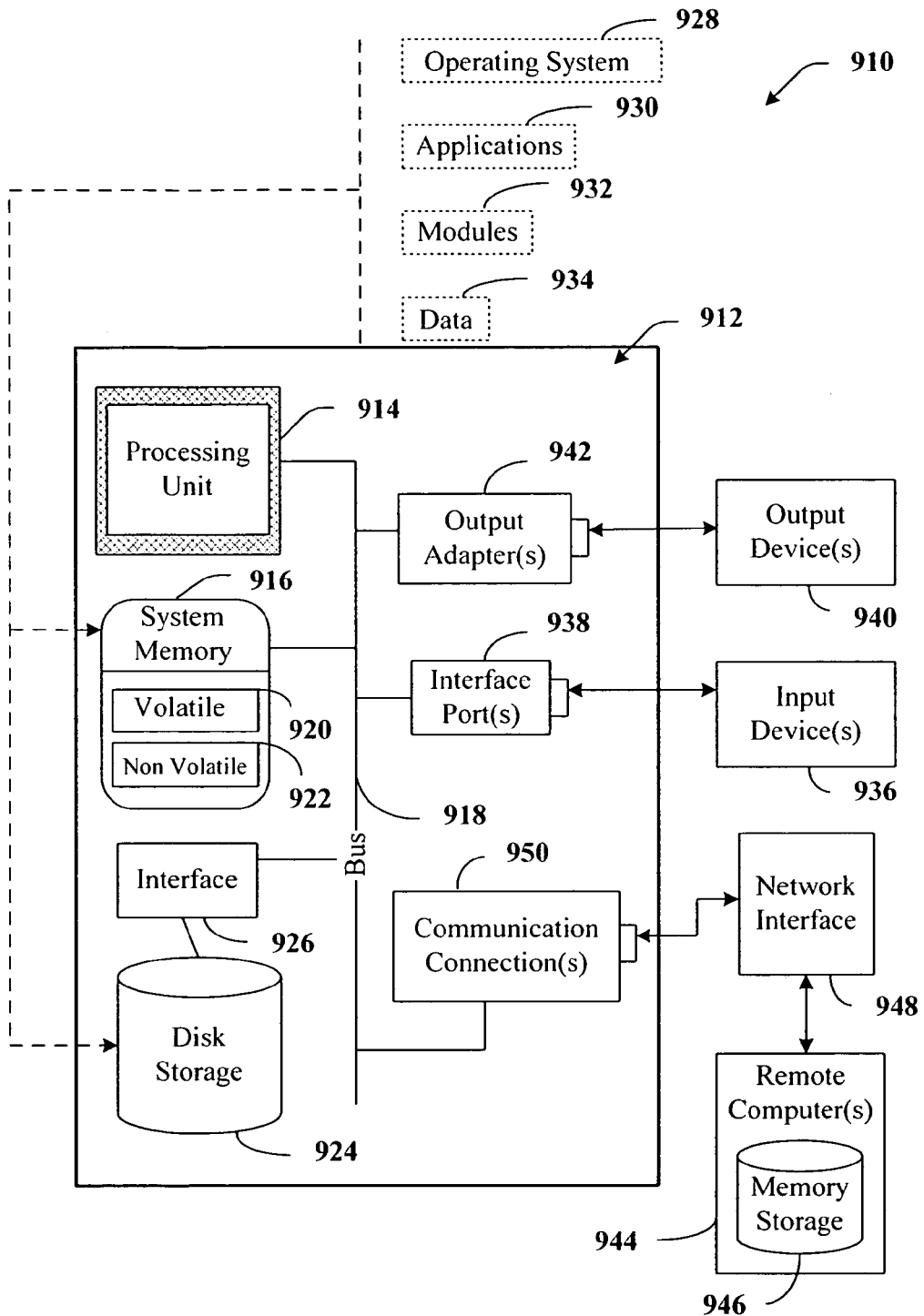
FIG. 9 illustrates an example operating environment in which the present invention may function.

In order to provide additional context for various aspects of the present invention, FIG. 9 and the following discussion are intended to provide a brief, general description of a suitable operating environment 910 in which various aspects of the present invention may be implemented. While the invention is described in the general context of computer-executable instructions, such as program modules, executed by one or more computers or other devices, those skilled in the art will recognize that the invention can also be implemented in combination with other program modules and/or as a combination of hardware and software. Generally, however, program modules include routines, programs, objects, components, data structures, etc. that perform particular tasks or implement particular data types. The operating environment 910 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 9, an exemplary environment 910 for implementing various aspects of the invention includes a computer 912. The computer 912 includes a processing unit 914, a system memory 916, and a system bus 918. The system bus 918 couples system components including, but not limited to, the system memory 916 to the processing unit 914. The processing unit 914 can be any of various available processors. Dual microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, an 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 916 includes volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable ROM (EEPROM), or flash memory. Volatile memory 920 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 912 also includes removable/nonremovable, volatile/nonvolatile computer storage media. FIG. 9 illustrates, for example a disk storage 924. Disk storage 924 includes, but is not limited to, devices like a magnetic disk drive, floppy disk drive, tape drive, Jaz drive, Zip drive, LS-100 drive, flash memory card, or memory stick. In addition, disk storage 924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or non-removable interface is typically used such as interface 926.

It is to be appreciated that FIG. 9 describes software that acts as an intermediary between users and the basic computer resources described in suitable operating environment 910. Such software includes an operating system 928. Operating system 928, which can be stored on disk storage 924, acts to control and allocate resources of the computer system 912. System applications 930 take advantage of the management of resources by operating system 928 through program modules 932 and program data 934 stored either in system memory 916 or on disk storage 924. It is to be appreciated that the present invention can be implemented with various operating systems or combinations of operating systems.

A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port may be used to provide input to computer 912, and to output information from computer 912 to an output device 940. Output adapter 942 is provided to illustrate that there are some output devices 940 like monitors, speakers, and printers among other output devices 940 that require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the bus 918. While communication connection 950 is shown for illustrative clarity inside computer 912, it can also be external to computer 912. The hardware/software necessary for connection to the network interface 948 includes, for exemplary purposes only, internal and external technologies such as, modems including regular telephone grade modems, cable modems and DSL modems, ISDN adapters, and Ethernet cards.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A cryptographic component, comprising:
a communication component that receives a request for decryption information from a BIOS component during an operating system boot process occurring after a hibernate mode; and,
a retrieval component that retrieves decryption information based, at least in part, upon the request, the retrieval component providing the decryption information to the communication component, the communication component providing the decryption information to the BIOS component during the operating system boot process occurring after a hibernate mode.

2. The component of claim 1, the decryption information comprising at least one of a decryption key, an encrypted decryption key and a decryption algorithm.

3. The component of claim 1, further comprising a storage component that facilitates storage of encryption information.

4. The component of claim 1 employed to secure access to at least one device.

5. The component of claim 4, the device comprising a storage volume, a video display, an input device and an output device.

6. A BIOS cryptographic system, comprising:
a BIOS component that facilitates a secure boot process of a computer system;
an operating system loader that facilitates loading of an operating system for the computer system; and,
a cryptographic component that serves as an interface between the BIOS component and the operating system loader, the cryptographic component providing decryption information to the BIOS component in response to a request for decryption information from the BIOS component to facilitate decryption of a file associated with a hibernate mode during an operating system boot process occurring after the hibernate mode.

7. The system of claim 6, the BIOS component employing a decryption algorithm to facilitate the secure boot of the computer system.

8. The system of claim 7, the decryption algorithm comprising a symmetric algorithm.

9. The system of claim 8, the decryption algorithm comprising RC2, RC4, Data Encryption Standard (DES), 3DES or AES.

10. The system of claim 7, the decryption algorithm comprising an asymmetric algorithm.

11. The system of claim 10, the decryption algorithm comprising RSA.

12. The system of claim 6, the decryption information comprising at least one of a decryption key, an encrypted decryption key and a decryption algorithm.

13. The system of claim 6, the cryptographic component comprising a decryption information store that securely stores the decryption information.

14. The system of claim 13, the decryption information comprising a decryption key.

15. The system of claim 14, the decryption key retrieved through an ACPI control method.

16. The system of claim 14, the decryption key retrieved through a BIOS boot interface.

17. The system of claim 6, the cryptographic component comprising an encryption information store that securely stores encryption information.

18. The system of claim 17, the encryption information comprising an encryption key.

19. The system of claim 17, the encryption key stored through an ACPI control method.

20. The system of claim 18, the encryption key stored through a BIOS boot interface.

21. The system of claim 6, the request for decryption information being based, at least in part, upon receipt of a BIOS password.

22. A method of securely restarting a computer system, comprising:
verifying a credential of a user;
retrieving decryption information; and
employing the decryption information to decrypt a hibernate file during an operating system boot process occurring after a hibernate mode.

23. The method of claim 22, the credential comprising a password.

24. The method of claim 22, the decryption information comprising at least one of a decryption key, an encrypted decryption key and a decryption algorithm.

25. A computer readable medium having stored thereon computer executable instructions for carrying out the method of claim 22.

26. A method of securely using a computer system, comprising:
verifying a credential of a user;
retrieving decryption information employing a decryption algorithm comprising an asymmetric algorithm; and employing the decryption information to securely access a device during an operating system boot process occurring after a hibernate mode.

27. The method of claim 26, the decryption information comprising at least one of a decryption key, an encrypted decryption key and a decryption algorithm.

28. The method claim 26, the device comprising at least one of a disk, a volatile memory, a CD ROM and a storage device.

29. A method of facilitating secure restarting of a computer system, comprising:

receiving a decryption information;

securely storing the decryption information, the decryption information to be employed by a BIOS component during the restarting of the computer system from a hibernate mode; and employing the decryption information by a BIOS component during the restarting of the computer system from the hibernate mode.

30. A data packet transmitted between two or more computer components that facilitates secure restarting of a computer system, the data packet comprising:

decryption information to be employed by a BIOS component to facilitate decryption of a hibernate file during the restarting of the computer system from a hibernate mode, the decryption information comprising at least one of a decryption key, an encrypted decryption key and a decryption algorithm.

31. A computer readable medium storing computer executable components of a cryptographic component, comprising:

a communication component that receives a request for decryption information from a BIOS component; and a retrieval component that retrieves decryption information from a hibernate file based, at least in part, upon the request, the retrieval component providing the decryption information to the communication component, the communication component providing the decryption information to the BIOS component during a restarting of a computer system from a hibernate mode.

32. A cryptographic component, comprising:

means for receiving a request for decryption information from a BIOS component;

means for retrieving decryption information employing a decryption algorithm comprising an asymmetric algorithm based, at least in part, upon the request; and means for providing the decryption information to the BIOS component during a restarting of the computer system from a hibernate mode.

* * * * *